3,046,313
PREPARATION OF PENTAFLUOROIODOBENZENE

Walter J. Pummer, Rockville, Md., and Leo A. Wall, Washington, D.C., assignors to the United States of America as represented by the Secretary of the Navy
No Drawing. Filed May 3, 1960, Ser. No. 26,660
2 Claims. (Cl. 260—650)
(Granted under Title 35, U.S. Code (1952), sec. 266)

The invention described herein may be manufactured and used by or for the Government of the United States of America for governmental purposes without the payment of any royalties thereon or therefor.

This invention relates to compounds containing the pentafluorophenyl group and methods of making these compounds. Compounds containing the pentafluorophenyl group are useful as intermediates of precursors for thermal-stable or fuel-resistant polymers or lubricating liquids.

An object of the invention is the preparation of certain of these compounds.

Other objects and many of the attendant advantages of this invention will be readily appreciated as the same becomes better understood by reference to the following detailed description.

The methods of the invention include the Grignard coupling or addition reaction and the Ullmann-type condensation. The following scheme illustrates some of these reactions:

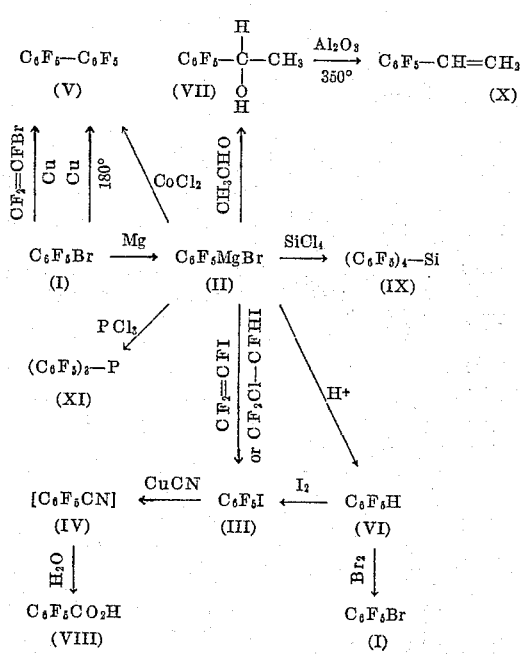

One of the compounds of this invention is pentafluoroiodobenzene. Since this compound contains a labile iodine atom, it can be used to synthesize numerous new aromatic fluorocarbons containing the perfluorophenyl, ($C_6F_5$), grouping. One specific use of this compound is as a percursor to tetrafluoroiodophenol, which in turn is a precursor for polyethers. These polyethers serve as thermal-stable liquids or waxes. The liquids are especially suitable for hydraulic fluids and lubricants. In accordance with the invention, pentafluoroiodobenzene ($C_6F_5I$) can be prepared by any one of three different methods.

PENTAFLUOROIODOBENZENE FROM PENTAFLUOROBROMOBENZENE AND 1,1,2 - TRIFLUORO-1-CHLORO-2-IODOETHANE

A Grignard reagent is prepared in the following manner. To 1 g. (0.041 g. atom) of magnesium turnings in 10 ml. of anhydrous ether is added 1 ml. of pentafluorobromobenzene (I) and a small crystal of iodine. Local heating is applied since it is necessary to initiate the reaction. When the reaction is sufficiently in progress, the flask containing the ingredients is cooled in an ice water bath and the remainder of the compound (I) (total 10 g., 0.04 mole) is added over a half-hour period. The Grignard solution is dark brown in color. When all the magnesium appears to be consumed, the solution is allowed to come to room temperature and is stirred for an additional half hour.

To the refluxing Grignard reagent solution (II), prepared from 10 g. (0.04 mole) of pentafluorobromobenzene (I), as just described, is added 9.76 g. (0.04 mole) of 1,1,2-trifluoro-1-chloro-2-iodoethane in 5 ml. of anhydrous ether. No noticeable heat effect is observed. The solution is refluxed for 3 hours. At the end of this time, a black solid appears on the sides of the flask in which the reaction is conducted. The mixture is allowed to stand at room temperature overnight and is finally decomposed by the addition of 50 ml. of 6N hydrochloric acid. The ether layer is separated, dried ($Na_2SO_4$), and distilled. There is obtained 5.78 g. (50%) of pentafluoroiodobenzene (III), B.P. 77° to 78°/35 mm., $n_D^{20}$=1.4990. Mass spectrometer analysis of this product shows it to be 98% pure.

PENTAFLUOROIODOBENZENE FROM PENTAFLUOROBROMOBENZENE AND TRIFLUOROIODOETHENE

To the Grignard reagent solution (II) prepared from 10 g. (0.04 mole) of pentafluorobromobenzene (I) as previously described, maintained at 0° C. by means of an ice bath, is added 12.4 g. (0.06 mole) of trifluoroiodoethene. The solution is stirred for one hour more and then refluxed for two hours. Decomposition is effected in the usual fashion. Distillation of the residue, after removal of the ether, yields 1 g. of pentafluoroiodobenzene (III) as well as some pentafluorobenzene (VI) and some unreacted pentafluorobromobenzene (I).

PENTAFLUOROIODOBENZENE FROM IODINATION OF PENTAFLUOROBENZENE

Pentafluoroiodobenzene can be prepared by iodination of pentafluorobenzene in 65% oleum as well as by the two previously described processes. To 200 g. (1.5 moles) of iodine and 1 kg. of 65% oleum, after stirring for one hour at room temperature, is added 255 g. of reduced hexafluorobenzene (a mixture containing 45% of hexafluorobenzene, 40% of pentafluorobenzene, and 10% of tetrafluorobenzene). The mixture is stirred for four hours at 55° to 60° C. It is allowed to come to room temperature overnight. The flask is cooled in an ice bath, and gradually 1 liter of ice water is added. It is diluted further with another liter of ice water, then decolorized with aqueous sodium bisulfite, and the products (177 g.) separated. After drying ($Na_2SO_4$) and distillation, there is obtained 36 g. of pentafluoroiodobenzene (B.P. 73° to 75°/35 mm., $n_D^{20}$=1.4990). In addition are obtained some unreacted hexafluorobenzene and some higher iodinated fluorobenzenes. Analysis—calculated for $C_6F_5I$: C, 24.5; I, 43.1. Found: C, 24.7; I, 42.1.

PERFLUORODIPHENYL

Another compound of the invention is perfluorodiphenyl ($C_6F_5$—$C_6F_5$). This compound is useful for the preparation of perfluorodixenyl ether which is a heat-stable liquid or wax. Perfluorodiphenyl can be prepared in accordance with the invention by two different methods: the Ullmann condensation of pentafluorobromobenzene, which gives good yields, and the Grignard coupling method with cobalt chloride, which gives a low yield.

*Perfluorodiphenyl (V)—Ullman Method.*—Five grams (0.02 mole) of pentafluorobromobenzene (I) and 2.5 g. (0.039 g. atom) of activated copper powder are sealed in an evacuated 5 mm. Pyrex tube 20 cm. long. The tube is placed in a furnace at 180° to 190° C. for 48 hours. At the end of this period the temperature is slowly raised to 290° and held at this temperature for 6 hours. It is allowed to cool. Upon cooling, the contents solidifies in long white needles. The tube is cooled in liquid nitrogen and opened. There is obtained 2.95 g. (87%) of perfluorodiphenyl, M.P. 63° to 66° C. A recrystallization from methanol, followed by sublimation at 50°/1 mm., affords white plates, M.P. 67.5° to 68° C. Analysis—calculated for $C_{12}F_{10}$: C, 43.05. Found: C, 42.9.

*Perfluorodiphenyl (V)—Grignard Coupling Method.*— The Grignard reagent, prepared from 10 g. (0.04 mole) of compound (I), 1 g. (0.04 g. atom) of magnesium turnings, and 25 ml. of anhydrous ether, is filtered into a dropping funnel and added slowly to a refluxing mixture of 0.4 g. (0.003 mole) of anhydrous cobalt chloride and 3 ml. of ethyl bromide in 3 ml. of anhydrous ether. The addition requires 45 minutes. The mixture is then refluxed for 2 hours more, cooled, and acidified with 50 ml. of 10% hydrochloric acid. The ether layer is separated, dried ($Na_2SO_4$), and distilled. There is obtained 2.5 g. (38%) of pentafluorobenzene, B.P. 84° to 86° C., and 0.5 g. of perfluorodiphenyl (V) (15%), M.P. 67° to 68° C.

PERFLUOROBENZONITRILE

Another new compound of the invention is perfluorobenzonitrile ($C_6F_5CN$). This compound (IV) is obtained from the reaction of pentafluoroiodobenzene and cuprous cyanide. Once the reaction is initiated, the products are immediately removed by vacuum distillation. This procedure leads to fair yield of pentafluorobenzonitrile, based on its hydrolysis product, pentafluorobenzoic acid (VIII). Perfluorobenzonitrile, being a precursor of pentafluorobenzoic acid, is thus also a precursor of phenyl pentafluorobenzoate, which is a stable fluid, not readily dissolving hydrocarbon polymers or swelling rubber.

PERFLUOROBENZONITRILE (IV) FROM PENTAFLUOROIODOBENZENE (III)

Five grams (0.017 mole) of pentafluoroiodobenzene (III), 1.6 g. (0.009 mole) of cuprous cyanide, and 1.34 g. (0.017 mole) of pyridine are placed in a small flask and gradually heated. The contents begins to darken with increasing temperature. At 150° C. the contents is a black viscous liquid. This temperature is maintained for 5 minutes more. The flask is allowed to cool to 100° C., and the apparatus is rearranged for distillation. The products are removed under reduced pressure obtained by a water aspirator. There is obtained 3.07 g. of yellow liquid, B.P. 185° to 190° C., $n_D^{23.8}=1.4764$. The liquid, on standing, gradually turns brown and probably contains some unreacted starting material (III). To show that the pentafluorobenzonitrile (IV) has indeed formed, the following procedure can be undertaken. Half of the above liquid, 1.5 g., is hydrolyzed with 75% sulfuric acid at 180° C. Upon pouring on ice, followed by an ether extraction and removal of the solvent, there is obtained 0.2 g. (16%, based on reacted material) of pentafluorobenzoic acid (VIII), M.P. 101° to 103° C. (reported M.P. 104° to 105°). There is obtained 0.4 g. of unreacted starting material.

PENTAFLUOROPHENYL-α-ETHANOL

Another compound of the invention is pentafluorophenyl-α-ethanol. This compound is a precursor to penafluorostyrene. This latter substance readily polymerizes to a high polymer having good physical appearance and resistance to hydrocarbon fluids. The preparation of this alcohol is as follows.

To the Grignard reagent, as prepared from 10 g. of pentafluorobromobenzene (I), is added rapidly at 0° C., 6.6 g. (0.15 mole) of acetaldehyde. The solution is stirred at 0° C. for one hour more, and finally decomposed by the addition of 50 ml. of 6N hydrochloric acid. The ether layer is separated, dried ($Na_2SO_4$), and distilled. There is obtained 7 g. (81%) of pentafluorophenyl-α-ethanol (VII), B.P. 80° to 82°/37 mm.; $n_D^{20}=1.4426$. Analysis—calculated for $C_8H_5O_5F$: C, 45.3; H, 2.35. Found: C, 44.0; H, 2.30.

PREPARATION OF TETRAKIS-[PENTAFLUOROPHENYL]-SILANE (IX)

Another compound of this invention is tetrakis-[pentafluorophenyl]-silane. This compound is prepared as follows. To the aforedescribed Grignard reagent prepared, however, in this case, from 24.7 g. (0.1 mole) of pentafluorobromobenzene, 2.43 g. (0.1 g. atom) of magnesium turnings in 50 ml. of anhydrous ether is added slowly 2.83 ml. (4.25 g.; 0.025 mole) of silicon tetrachloride at 0° C. When the addition is completed, the contents is stirred for one-half hour more at 0° C., then refluxed for 2½ hours more, and allowed to cool overnight. The contents is poured into 100 ml. of 6N hydrochloric acid, and the brown solid (9 g.) is removed by filtration. After drying, the solid is sublimed at 208° C./1 mm., to yield 5.5 g. (32%) of tetrakis-[pentafluorophenyl]-silane as white short needles, M.P. 246° to 248° C. This compound, like tris-[pentafluorophenyl]-phosphine, hereinafter described, is an oxidation and fuel-resistant substance.

TRIS-[PENTAFLUOROPHENYL]-PHOSPHINE (XI)

Another compound of this invention is tris-[pentafluorophenyl]-phosphine.

To the aforedescribed Grignard reagent prepared, however, in this case from 30 g. (0.12 mole) of pentafluorobromobenzene and 3 g. (0.12 g. atom) of magnesium turnings in 0.75 ml. anhydrous ether is added dropwise 5.0 g. (0.037 mole) of phosphorus trichloride in 20 ml. of anhydrous ether. The flask is cooled in an ice-water bath. After the addition, the ice-bath is removed and the flask is allowed to stand at room temperature for 15 minutes. The solution is hydrolyzed with 40 ml. of cold dilute hydrochloric acid (10% by volume). The layers are separated and the acidic solution is extracted twice with 30 ml. portions of ether. The combined ether solution is dried over anhydrous calcium sulfate and concentrated under reduced pressure to give 13.1 g. of a dark brown solid. Sublimation under reduced pressure at 100° to 130°% C. gives 8.5 g. (39.5%) of tris-[pentafluorophenyl]-phosphine, white needle-like crystals, M.P. 114° to 115° C. Oxidation of 2.0 g. (0.0037 mole) of the tris-[pentafluorophenyl]-phosphine can be carried out by refluxing the compound for hours in a solution of 10 g. sodium dichromate, 25 ml. water, 10 ml. concentrated surfuric acid, and 25 ml. glacial acetic acid. After neutralization of the acid solution and extraction with chloroform, 2 g. of fine white needle-like crystals of tris-[pentafluorophenyl]-phosphine oxide are obtained, M.P. 167° to 168° C.

PENTAFLUOROSTYRENE (X)

Another compound of this invention is pentafluorostyrene. This compound is a monomer useful for the preparation of polypentafluorostyrene, a polymer possessing the mal stability and fuel resistance. The product is prepared as follows.

Two grams of pentafluorophenyl-α-ethanol (VII) is passed through a 10 mm. diameter by 20 cm. glass tube containing 5 g. of alumina pellets at 345° to 350° C. with the aid of nitrogen gas. The product (1.4 g.) is caught in a solidified carbon dioxide trap and later distilled after drying (Na$_2$SO$_4$). There is obtained 0.6 g. (33%) of pentafluorostyrene (X), B.P. 140° to 141° C., $n_D^{20}$=1.4414. Mass spectrometer analysis of the product indicates a slight contamination with the starting material (VII).

Obviously many modifications and variations of the present invention are possible in the light of the above teachings. It is therefore to be understood that within the scope of the appended claims the invention may be practiced otherwise than as specifically described.

What is claimed is:

1. The process of making pentafluoroiodobenzene which comprises preparing the Grignard reagent pentafluorophenylmagnesium bromide from pentafluorobromobenzene; and reacting said Grignard reagent with 1,1,2-trifluoro-1-chloro-2-iodoethane.

2. The process of making pentafluoroiodobenzene which comprises preparing the Grignard reagent pentafluorophenylmagnesium bromide from pentafluorobromobenzene; and reacting said Grignard reagent with trifluoroiodoethene.

References Cited in the file of this patent

Nield et al.: J. Chem. Soc. (London), January 1959, p 169.

UNITED STATES PATENT OFFICE
CERTIFICATE OF CORRECTION

Patent No. 3,046,313                              July 24, 1962

Walter J. Pummer et al.

It is hereby certified that error appears in the above numbered patent requiring correction and that the said Letters Patent should read as corrected below.

Column 4, line 59, before "hours" insert -- 6 --; line 70, for "the mal" read -- thermal --.

Signed and sealed this 28th day of May 1963.

(SEAL)
Attest:

ERNEST W. SWIDER
Attesting Officer

DAVID L. LADD
Commissioner of Patents